United States Patent
Herinckx et al.

(10) Patent No.: US 6,675,435 B2
(45) Date of Patent: Jan. 13, 2004

(54) WINDSHIELD WIPER FOR MOTOR VEHICLES

(75) Inventors: Dirk Herinckx, Drieslinter (BE); Jurgen Roekens, Steenokkerseel (BE)

(73) Assignee: Robetr Bosch GmbH, Stuttgart (DE)

( * ) Notice: Subject to any disclaimer, the term of this patent is extended or adjusted under 35 U.S.C. 154(b) by 0 days.

(21) Appl. No.: 10/048,881

(22) PCT Filed: May 23, 2001

(86) PCT No.: PCT/DE01/01963

§ 371 (c)(1), (2), (4) Date: Apr. 29, 2002

(87) PCT Pub. No.: WO01/94166

PCT Pub. Date: Dec. 13, 2001

(65) Prior Publication Data

US 2002/0133895 A1 Sep. 26, 2002

(30) Foreign Application Priority Data

Jun. 9, 2000 (DE) .......................... 100 28 628

(51) Int. Cl.7 ................ B60S 1/38; B60S 1/32
(52) U.S. Cl. ................ 15/250.46; 15/250.44; 403/24; 403/150; 403/161; 403/163
(58) Field of Search ............ 15/250.46, 250.32, 15/250.31, 250.44, 250.361, 250.47; 403/24, 150, 161, 163, 154, 155

(56) References Cited

U.S. PATENT DOCUMENTS 4,788,736 A * 12/1988 Arai et al. ............... 15/250.46
4,909,653 A    3/1990 Biggs ...................... 15/250.46
4,971,472 A * 11/1990 Pethers ........................ 403/24
5,073,060 A * 12/1991 Pethers ........................ 403/13

FOREIGN PATENT DOCUMENTS

| DE | 23 36 071 A  | 2/1974 |
| DE | 24 01 208 A  | 7/1975 |
| DE | 198 33 665 A | 2/2000 |

* cited by examiner

Primary Examiner—Gary K. Graham
(74) Attorney, Agent, or Firm—Michael J. Striker

(57) ABSTRACT

A windshield wiper for motor vehicles, having a support bracket (1) for connection to a wiper arm secured to a motor vehicle, wherein the support bracket (1) has an essentially U-shaped cross section and at least one support bracket detent recess (7); at least one lower bracket (2) for connection to a rubber wiper blade, wherein the lower bracket (2) has an essentially U-shaped cross section, has at least one lower bracket detent recess (11), and is at least partly embraced by the support bracket (1); and a joint (3) for pivotably connecting the at least one lower bracket (2) to the support bracket (1), wherein the joint (3) has a joint base body (12) at least partly embraced by the lower bracket (2), at least one lower bracket detent body (13), connected to the joint base body (12), for locking onto the at least one lower bracket detent recess (11), and at least one support bracket detent body (16), provided on the at least one lower bracket detent body (13), for locking onto the at least one support bracket detent recess (7).

10 Claims, 3 Drawing Sheets

WINDSHIELD WIPER FOR MOTOR VEHICLES

BACKGROUND OF THE INVENTION

The invention relates to a windshield wiper for motor vehicles.

In the prior art, numerous possibilities are known, in a windshield wiper, for pivotably connecting a support bracket, connected to the wiper arm, to a lower bracket that carries a wiper blade. Most of these joints for connecting the lower bracket and the support bracket are complicated in structure and are unsuited to automated assembly.

SUMMARY OF THE INVENTION

The object of the invention is to refine a windshield wiper of the type defined above in such a way that a pivotable connection between the support bracket and the lower bracket that can be assembled as simply as possible and is durable is created.

The nucleus of the invention is to provide the joint with a joint base body, which can be inserted from below into the lower bracket. The joint base body is connected to a lower bracket detent body for locking onto the lower bracket. The lower bracket detent body furthermore has a support bracket detent body for locking onto the support bracket.

Additionally, two lower bracket detent bodies are provided. As a result, it is possible to fix the joint relative to the lower bracket.

Additionally, the two lower bracket detent bodies are pivotable elastically counter to one another. This makes assembly easier.

Additionally, the joint base body has an oval cross section. This is a geometric shape that is especially easy to produce.

Additionally, the joint base body is embodied cylindrically. This is a basic shape that is very easy to produce from the standpoint of production technology.

Additionally, the lower bracket detent body has a spring slit. This makes it possible to compress the lower bracket detent body.

BRIEF DESCRIPTION OF THE DRAWINGS

Additional characteristics and details of the invention will become apparent from the description of three exemplary embodiments in conjunction with the drawing. Shown are.

DESCRIPTION OF THE PREFERRED EMBODIMENTS

Figure 1:
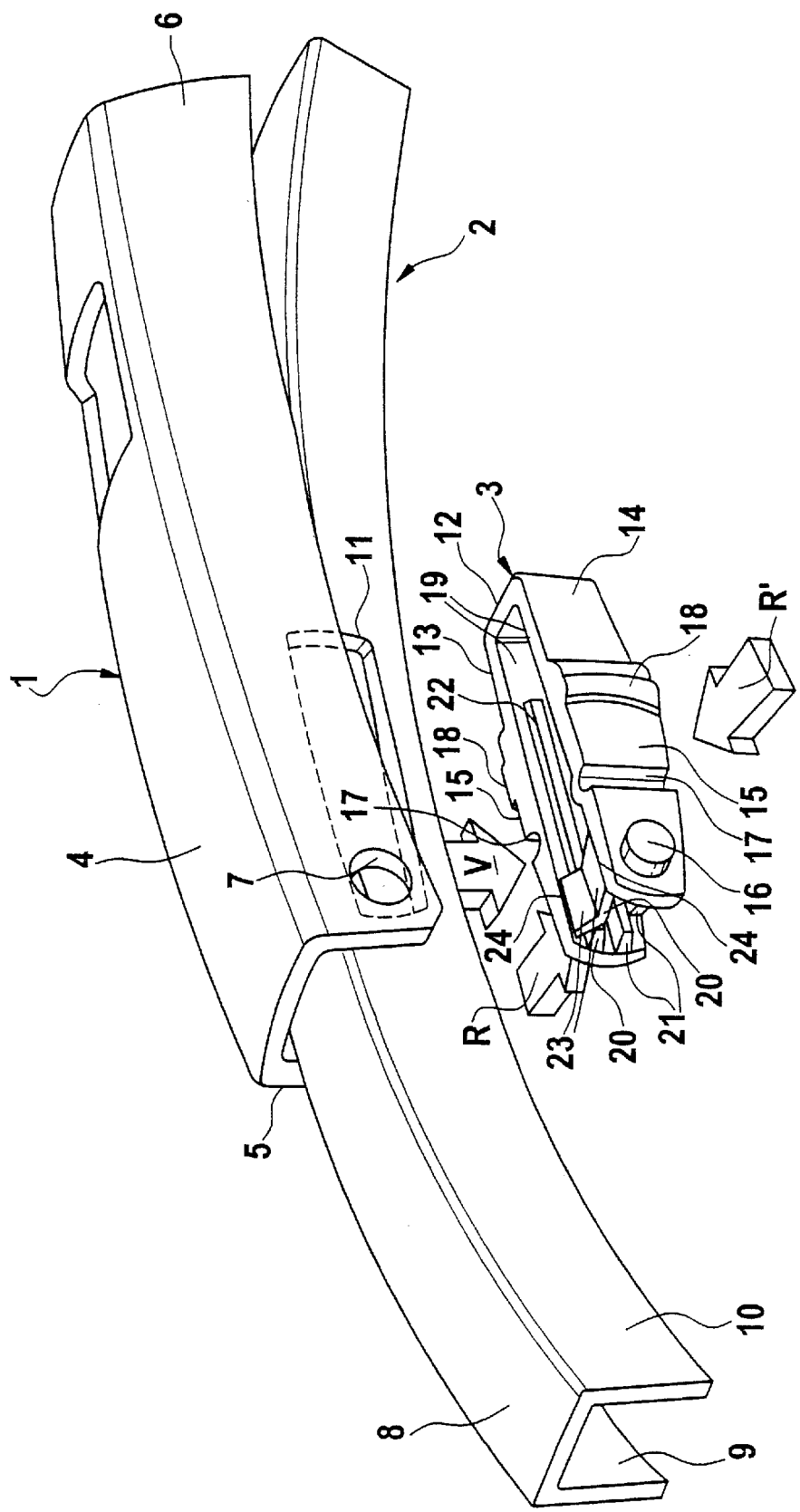
FIG. 1, an exploded view of a support bracket with a joint and lower bracket, in accordance with a first embodiment.

A first embodiment of the invention will be described below in conjunction with FIG. 1. A windshield wiper for a motor vehicle is pivotably connected to the free end of a wiper arm, which in turn is connected to a motor vehicle. The windshield wiper has a central support bracket 1, connected to the wiper arm; this support bracket is also known as a middle bracket. In the region of the two free ends of the support bracket 1, a respective lower bracket 2, also known as a claw bracket, is pivotably connected via a joint 3, which is made from POM or some other suitable plastic. A rubber wiper blade or another lower bracket 2 is secured to the free ends of the two lower brackets 2.

The support bracket 1, which is of metal, has a U-shaped cross section open toward the bottom and is formed by a support bracket base 4 and by two support bracket legs 5, 6 extending vertically downward from the edge of the base; the base 4 and the legs 5, 6 are embodied integrally with one another. A detent bore 7, embodied as a support bracket detent recess, is provided in each of the legs 5, 6, and the two detent bores 7 are opposite one another.

The metal lower bracket 2 likewise has a U-shaped cross section that is open at the bottom, and it is formed by one lower bracket base 8 and two lower bracket legs 9, 10 extending vertically downward from the edge of the base; the base 8 and the legs 9,10 are embodied integrally with one another. An oblong slot 11, embodied as a lower bracket detent recess, with an essentially rectangular cross section is provided in each of the legs 9, 10; the orientation of its longitudinal length is essentially parallel to that of the lower bracket 2. The oblong slots 11 provided in the legs 9, 10 are opposite one another. The support bracket 1 is dimensioned such that it can partly embrace the lower bracket 2, with play.

The plastic joint 3 has an essentially U-shaped cross section, and the base of the U is called the joint base body 12. The joint base body 12 is connected integrally to two detent arms 13, 14, embodied as lower bracket detent bodies, which extend essentially parallel to one another. The detent arms 13, 14 are pivotable elastically counter to one another. Each of the detent arms 13, 14 has one outward-protruding detent protrusion 15, extending from its respective free end toward the joint base body 12; the detent protrusion is thicker than the remaining portion of the detent arms 13 or 14 and corresponds in contour to the shape of the oblong slot 11. In the vicinity of the free end of the detent arm 13 and 14, a cylindrical detent peg 16 is provided, protruding outward relative to the detent protrusion 15 and embodied as a support bracket detent body; its diameter is slightly less than the diameter of the detent bore 7. Adjacent the detent peg 16 and between it and the joint base body 12, a longitudinal groove 17 is provided, which extends substantially perpendicular to the longitudinal direction of the detent arms 13, 14. Between the longitudinal groove 17 and the joint base body 12, a guide rib 18 is provided on the detent protrusion 15, protruding relative to this detent protrusion. Two spring elements 20, 21, associated with one another, are provided on the inside 19 of the detent arms 13, 14. The spring elements 20, 21 each comprise one base strip 22, protruding at an acute angle from the inside 19 and embodied integrally with the respective detent arm 13 or 14, and one cover strip 23, also protruding at an acute angle from the inside 19 and embodied integrally with the respective detent arm 13 and 14; the cover strip rests on the base strip 22 and protrudes past it. The cover strips 23 are each joined by film hinges 24 to the detent arms 13, 14. Relative to a plane of symmetry extending through the joint base body 12, the joint 3 is embodied mirror-symmetrically.

The assembly of the windshield wiper in the first embodiment will now be described. For assembly, the two detent arms 13, 14 are pressed together in the direction of the arrows R and R', counter to the counterforce generated by the elasticity of the detent arms 13, 14 and by the compression of the spring elements 20 and 21. Next, the support bracket 1 is slipped over the lower bracket 2, so that the detent bore 7 is substantially in alignment with the end, shown on the left in FIG. 1, of the oblong slot 11. The unit comprising the support bracket 1 and the lower bracket 2 is slipped onto the joint 3 along the direction of the arrow V, until this joint is locked onto the support bracket 1 and the lower bracket 2. In this process, the detent protrusion 15 enters into engagement with the oblong slot 11, and the detent peg 16 enters into engagement with the detent bore 7. The lower bracket 2 is now pivotably connected to the support bracket 1 and is pivotable about the detent peg 16; the possible range of pivoting is selected such that it is adapted to the changes in curvature during wiping of a windshield or rear window of a motor vehicle. The inside 25 of the legs 5, 6 slides along the guide ribs 18, which prevents the legs 5, 6 from sliding directly on the legs 8, 9, which would cause metallic scraping noises. The advantage of the joint 3 is that the lower bracket 2 and support bracket 1, which are both of metal, can be assembled simply, quickly and automatically, since all that has to be done is to lock the parts onto one another in detent fashion. It is especially advantageous that the joint 3 is embodied mirror-symmetrically. In automated assembly, an otherwise complicated orientation of the joint 3 is thus unnecessary, and as a result the automated assembly can be speeded up greatly.

Figure 2:
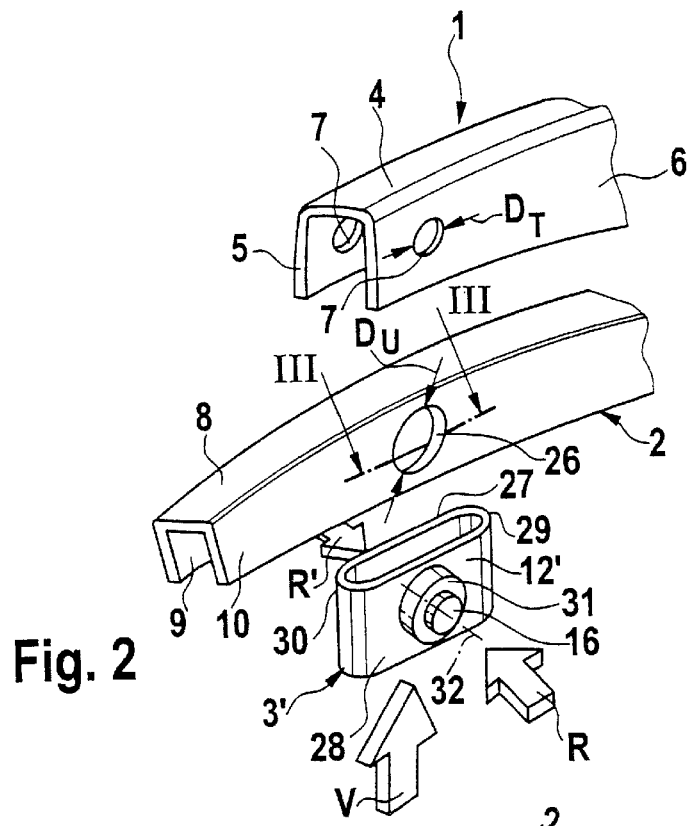
FIG. 2, an exploded view of a support bracket with a joint and lower bracket, in accordance with a second embodiment.
Figure 3:
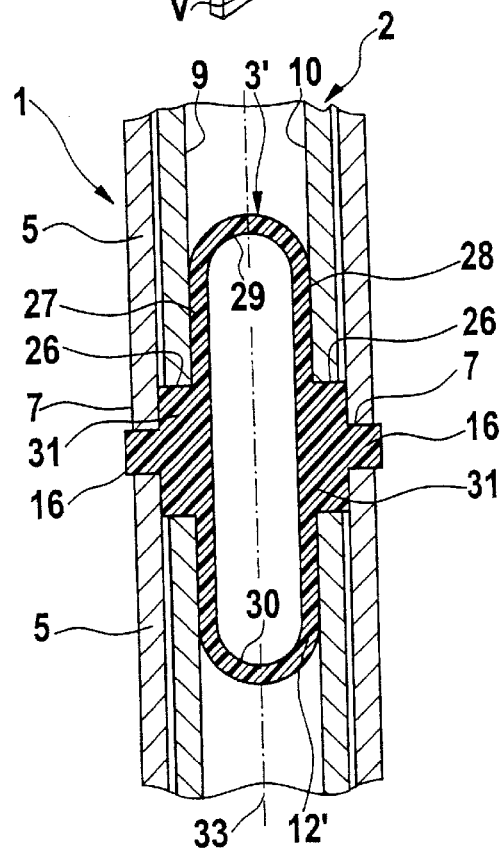
FIG. 3, a cross-sectional view taken along the section line III—III of FIG. 2.

A second embodiment of the invention will now be described, in conjunction with FIGS. 2 and 3. Identical parts are assigned the same reference numerals as in the first embodiment. Structurally different but functionally identical parts are given the same reference numerals with a prime. Otherwise, reference is made to the description of the first embodiment. The support bracket 1 has two opposed detent bores 7 that have a circular cross section and a diameter DT. The lower bracket 2 has two opposed receiving bores 26 with a circular cross section and a diameter $D_U$; $D_U > D_T$.

The plastic joint 3' is embodied as a hollow-profile body with an essentially oval cross section. It has two opposed, parallel side walls 27, 28, which are joined to one another via curved connecting walls 29, 30. The walls 27, 28, 29 and 30 are embodied integrally with one another. The walls 27, 28 are elastically compressible. On the outside of the walls 27, 28, a disk 31 embodied as a lower bracket detent body is provided in the middle; its diameter perpendicular to the pivot axis 32 is slightly less than the diameter $D_U$. The thickness of the disk 31 is selected such that it is slightly greater than the thickness of the legs 9 or 10. It is also possible to provide the disk with a noncircular cross section, such as a rectangular cross section; in that case, the inside contours of the receiving bore 26 are shaped accordingly as well. A nonround cross section has the advantage that the joint 3' is fixed relative to the lower bracket 2 in terms of pivoting motions about the pivot axis 32. A cylindrical detent peg 16 embodied as a support bracket detent body is provided on the disk 31; its diameter is slightly less than the diameter DT. The joint 3' is embodied mirror-symmetrically with respect to a plane of symmetry 33 extending perpendicular to the pivot axis 32. The joint 3' is moreover symmetrical relative to a rotation of 180° about the pivot axis 32.

For assembly, the two side walls 27, 28 are pressed together along the arrows R and R'. Next, the support bracket 1 is slipped onto the lower bracket 2, so that the detent bores 7 and the receiving bores 26 come to coincide. Next, the pressed-together joint 3' is inserted from below in the direction of the arrow V into the lower bracket 2, until the disks 31 lock onto the respective receiving bores 26, and the detent pegs 16 lock onto to the detent bores 7. The lower bracket 2 is now pivotable about the pivot axis 32 relative to the support bracket 1. The advantages in automated assembly described in conjunction with the exemplary embodiment apply equally here.

Figure 4:
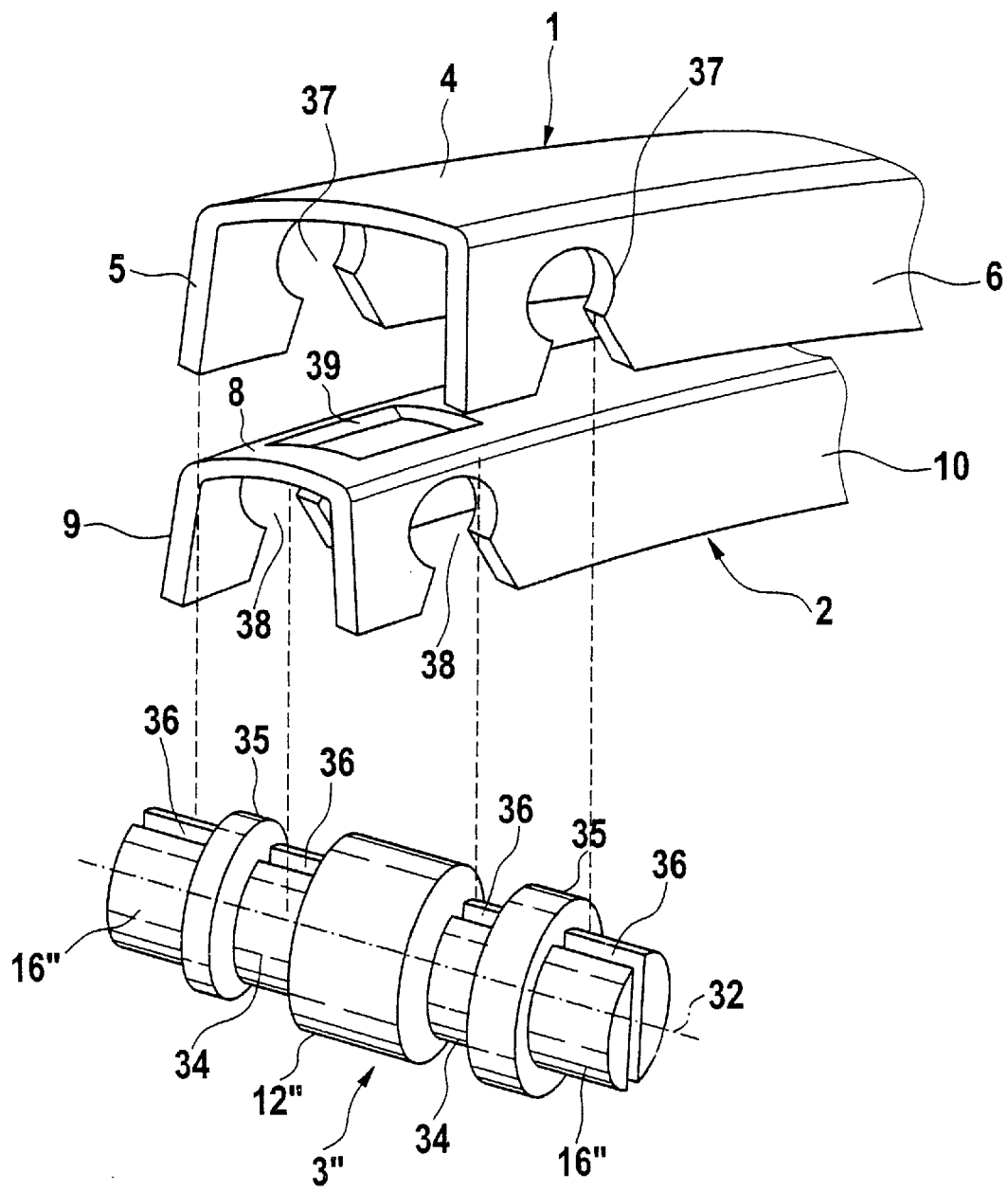
FIG. 4, an exploded view of a support bracket with a joint and lower bracket, in accordance with a third embodiment.

A third embodiment of the invention will now be described in conjunction with FIG. 4. Identical parts are assigned the same reference numerals as in the first embodiment. Parts that are different but functionally identical are given the same reference numerals with double primes. Otherwise, reference is made to the description of the first exemplary embodiment. The joint 3" essentially takes the shape of a cylindrical pin. The joint 3" has a cylindrical joint base body 12" as well as a cylindrical detent neck 34, one provided on each of the two face ends, which is embodied as a lower bracket detent body and has a diameter that is slightly less than the diameter of the joint base body 12". On the outer face ends of the detent necks 34, guide rings 35 are provided, whose diameter is greater than that of the detent necks 34 but less than that of the joint base body 12". One cylindrical detent peg 16" is provided on the outer face end of each of the guide rings 35; the diameter of each detent peg is essentially equivalent to that of the detent necks 34. The detent necks 34 and the detent pegs 16" have spring slits 36 that divide them in half. The joint base body 12", the detent necks 34, the guide rings 35, and the detent pegs 16" are embodied integrally. Relative to a plane of symmetry passing through the base body 12" perpendicular to the pivot axis 32, the joint 3" is embodied mirror-symmetrically. Furthermore, the outer contour of the joint does not vary in response to rotations about the pivot axis 32.

The support bracket 1 has opposed support bracket detent recesses 37, which are disposed in the legs 5, 6 and take the form of a keyhole open at the bottom. In the legs 9 and 10, the lower bracket 2 has two opposed lower bracket detent recesses 38, which likewise take the shape of a keyhole open at the bottom. A base body recess 39 of essentially rectangular cross section is provided in the base 8 between the detent recesses 38.

For assembly, the lower bracket 2 is slipped onto the joint 3", in the course of which the detent necks 34 lock onto the lower bracket detent recesses 38. By means of the spring slits 36, the detent necks are elastically compressible to a certain extent, so that it is possible to slide them through the narrowest point of the keyhole-shaped detent recess 38. Next, the support bracket 1, partly embracing the lower bracket 2, is slipped onto the detent pegs 16", causing the latter to enter into the detent engagement with the detent recesses 37. The spring slits 36 perform the same function here. Fixation of the joint 3" along the pivot axis 32 is attained by providing that the base body 12" is thrust partway through the base body recess 39, which in terms of its width is adapted to the width of the joint body 12". The guide rings 35 assure that the support bracket 1 is pivotable, at a predetermined spacing from the lower bracket 2, about the pivot axis 32, so that friction does not occur between the legs 5 and 9 on the one hand and 6 and 10 on the other. With respect to the advantages of assembly, see the description of the first exemplary embodiment.

What is claimed is:
1. A windshield wiper for motor vehicles, having
a) a support bracket (1) for connection to a wiper arm secured to a motor vehicle, wherein the support bracket (1) has
   i) an essentially U-shaped cross section and
   ii) at least one support bracket detent recess (7; 37)
b) at least one lower bracket (2) for connection to a rubber wiper blade, wherein the lower bracket (2)
   i) has an essentially U-shaped cross section, ii) has at least one lower bracket detent recess (11; 26; 38), and iii) is at least partly embraced by the support bracket (1); and c) a joint (3; 3'; 3") for pivotably connecting the at least one lower bracket (2) to the support bracket (1), wherein the joint (3; 3'; 3";) has i) a joint base body (12; 12'; 12";) at least partly embraced by the lower bracket (2), ii) at least one lower bracket detent body (13, 14; 31; 34), connected to the joint base body (12; 12'; 12"), for locking onto the at least one lower bracket detent recess (11; 26; 38), and iii) at least one support bracket detent body (16, 16"), provided on the at least one lower bracket detent body (13, 14; 31; 34), for locking onto the at least one support bracket detent recess (7; 37).

2. The windshield wiper of claim 1, characterized in that two lower bracket detent bodies (13, 14; 31; 34) are provided.

3. The windshield wiper of claim 2, characterized in that the two lower bracket detent bodies (13, 14; 31; 34) are pivotably elastically counter to one another.

4. The windshield wiper of claim 1, characterized in that the joint (3) has an essentially U-shaped cross section with two detent arms (13, 14), which are connected to the joint base body (12).

5. The windshield wiper of claim 1, characterized in that the joint base body (12') has an oval cross section.

6. The windshield wiper of claim 5, characterized in that the lower bracket detent bodies (31') are embodied cylindrically.

7. The windshield wiper of claim 1, characterized in that the joint base body (12") is embodied cylindrically.

8. The windshield wiper of claim 7, characterized in that the lower bracket detent bodies (34) have a spring slit (36).

9. The windshield wiper of claim 1, characterized in that at least the support bracket detent body (16; 16") has an essentially circular cross section.

10. The windshield wiper of claim 9, characterized in that the support bracket detent body (16") has a spring slit (36).

* * * * *